(12) United States Patent
Kim

(10) Patent No.: US 7,813,379 B2
(45) Date of Patent: Oct. 12, 2010

(54) APPARATUS AND METHOD FOR TRANSMITTING AND RECEIVING WIRELESS PACKET DATA

(75) Inventor: Noh-Sun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 951 days.

(21) Appl. No.: 11/637,321

(22) Filed: Dec. 12, 2006

(65) Prior Publication Data

US 2007/0133579 A1  Jun. 14, 2007

(30) Foreign Application Priority Data

Dec. 12, 2005  (KR) ...................... 10-2005-0122151

(51) Int. Cl.
*H04J 3/18* (2006.01)
(52) U.S. Cl. ...................... 370/477; 370/464; 370/469; 370/470; 370/472; 370/476; 370/523
(58) Field of Classification Search ................. 370/477, 370/464, 469–480
See application file for complete search history.

(56) References Cited

U.S. PATENT DOCUMENTS

| | | | |
|---|---|---|---|
| 6,038,231 A * | 3/2000 | Dolby et al. ................. | 370/394 |
| 7,050,413 B2 * | 5/2006 | Takano ....................... | 370/335 |
| 7,072,296 B2 * | 7/2006 | Turner et al. ............. | 370/230.1 |
| 7,301,929 B2 * | 11/2007 | Frederiksen et al. ........ | 370/342 |
| 2007/0076680 A1 * | 4/2007 | Amram et al. .............. | 370/349 |
| 2009/0098892 A1 * | 4/2009 | Trogolo et al. .............. | 455/466 |
| 2009/0257454 A1 * | 10/2009 | Maltsev et al. ............. | 370/480 |

* cited by examiner

*Primary Examiner*—Kent Chang
*Assistant Examiner*—Magdi Elhag
(74) *Attorney, Agent, or Firm*—The Farrell Law Firm, LLP

(57) ABSTRACT

An apparatus and method for transmitting and receiving wireless packet data are provided. In a wireless packet data transmitter for transmitting to a wireless packet data receiver data packet on a transport channel and control information for supporting the transport channel on a control channel in a wireless packet data communications system, a padding bit eliminator eliminates optional padding bits of a variable size from a transport block for data packet transmission. A transport channel encoder for transport channel-encodes the transport block without the padding bits and transmits the encoded transport block on the transport channel. A control channel encoder control channel-encodes the control information including a padding bit number indicator indicating the number of the eliminated padding bits and transmits the encoded control information on the control channel.

10 Claims, 8 Drawing Sheets

APPARATUS AND METHOD FOR TRANSMITTING AND RECEIVING WIRELESS PACKET DATA

PRIORITY

This application claims priority under 35 U.S.C. §119 to an application entitled "Apparatus and Method for Transmitting and Receiving Wireless Packet Data" filed in the Korean Intellectual Property Office on Dec. 12, 2005 and assigned Serial No. 2005-122151, the contents of which are incorporated herein by reference.

BACKGROUND OF THE INVENTION

1. Field of the Invention

The present invention relates generally to a packet data service system, and in particular, to a wireless packet data service system in a wireless mobile environment.

2. Description of the Related Art

Mobile communications systems are being developed to be high-speed, high-quality wireless packet data communications systems to additionally provide data service and multimedia service beyond voice-oriented service that was available at an early development stage.

The $3^{rd}$ Generation Partnership Project (3GPP) standardization of High Speed Downlink Packet Access (HSDPA) and the 3GPP2 standardization of 1×Evolution for Data and Voice (EV-DV) in Release 5 are good examples of the efforts to find a solution to wireless data packet transmission service with high quality at a high speed of 2 Mbps or above in a 3G mobile communication system. $4^{th}$ Generation (4G) mobile communication systems aim to provide higher-speed, higher-quality multimedia service. Enhanced Uplink Dedicated Channel (EUDCH) under discussion in Release 6 is also an example of one of the efforts to transmit high-speed, high-quality wireless data packets on the uplink.

Obstacles to high-speed, high-quality data service in wireless communications are caused mainly by a radio channel environment. The radio channel environment frequently changes due to signal power changes by fading as well as white noise, shadowing, Doppler effects caused by user mobility and frequent mobile velocity changes, and interference from other users and multipath signals.

To provide high-speed wireless packet data service, therefore, other advanced technologies than those provided in the existing 2nd Generation (2G) or 3G mobile communication systems are needed for increasing the adaptability to channel changes. Although fast power control used in the legacy systems increases the adaptability to channel changes, the 3GPP and the 3GPP2, which are working on the standardization of high-speed packet data transmission systems, commonly address Adaptive Modulation and Coding (AMC) and Hybrid Automatic Repeat reQuest (HARQ).

The AMC adaptively selects a modulation scheme and a coding rate according to the downlink channel environment. The downlink channel environment is evaluated based on feedback information about a Signal-to-Noise Ratio (SNR) measurement received from a User Equipment (UE), and the modulation scheme and the coding rate are determined according to the downlink channel environment.

In an AMC system, a high-order modulation scheme such as 16-ary Quadrature Amplitude Modulation (16QAM) or 64QAM and a high coding rate such as 3/4 are selected for a good channel environment in which a UE near to a Node B is usually situated. For a UE at a cell boundary, a low-order modulation scheme like Quadrature Phase Shift Keying (QPSK) or 8-ary Phase Shift Keying (8PSK) and a low coding rate like 1/2 are used. This AMC technology reduces interference and improves system performance on the whole, compared to the conventional fast power control.

The HARQ is a link control scheme for the case where, in the presence of errors in an initially transmitted packet, packet retransmission is requested to compensate for the error packet. The HARQ is broken up into Chase Combining (CC), Full Incremental Redundancy (FIR), and Partial Incremental Redundancy (PIR).

In the CC, the same packet as initially transmitted is retransmitted. A receiver combines the retransmitted packet with the initially transmitted packet buffered in a reception buffer, thereby increasing the reliability of coded bits input to a decoder and thus achieving an overall system performance gain. Combining the same two packets is equivalent to iterative coding in effect. Thus, a performance gain of about 3 dB is achieved on the average.

The FIR improves decoder performance at the receiver by transmitting a retransmission packet having only redundant bits generated from a channel encoder, rather than retransmitting the same packet. As the decoder uses both the initial transmission information and the new redundant bits, the resulting decrease in coding rate increases the decoder performance. It is well known in coding theory that a higher performance gain is obtained by a low coding rate than by iterative coding. Only in terms of performance gain, the FIR outperforms the CC.

In contrast to the FIR, the PIR transmits packet data with information bits and new redundant bits at a retransmission. At decoding, the information bits are combined with initially transmission information bits, thereby achieving the same effects as the CC, and the use of the redundant bits results in the effects of the FIR. Since the PIR uses a higher coding rate than the FIR, it performs between the FIR and the CC. However, since many considerations including system complexity such as a buffer size at the receiver and signaling, as well as performance must be taken into consideration when selecting an HARQ technique, it is not easy to determine one of the above HARQ techniques.

While the AMC and the HARQ are independent technologies for increasing adaptability to link changes, the use of them in combination can remarkably improve system performance. Once a modulation scheme and a coding rate are adaptively determined according to the downlink channel condition by the AMC, packet data is correspondingly transmitted. If the receiver fails to decode the packet data, it requests a retransmission. The Node B retransmits predetermined packet data by a predetermined HARQ scheme in response to the retransmission request.

While the above-described schemes are applicable to HSDPA, 1×EV-DV, and EUDCH, they will be described herein in the context of channels used for HSDPA. FIG. 1 is a diagram illustrating the timing relationship between two channels adopted to support HSDPA, a High Speed Shared Control CHannel (HS-SCCH) and a High-Speed Physical Downlink Shared CHannel (HS-PDSCH). The HS-PDSCH is a transport channel for delivering packet data from a transmitter in a Node B to a receiver in a UE, and the HS-SCCH carries control information for supporting the HS-PDSCH.

Referring to FIG. 1, the UE demodulates the HS-SCCH for a time period (HS-PDSCH) being two slots before the HS-PDSCH to acquire control information necessary for demodulation of the HS-PDSCH. In FIG. 1, $T_{slot}$ represents a time slot which is 2,560 chips. A High-Speed Downlink Shared CHannel (HS-DSCH) is a downlink transport channel that carries high-speed downlink packet data. It is composed of one or more HS-PDSCHs. The HS-PDSCH is a physical channel that delivers the HS-DSCH.

The HS-SCCH is divided into two parts each delivering control information as illustrated in Table 1 below. Numerals in brackets indicate the number of information bits.

TABLE 1

| Part 1 | Part 2 |
|---|---|
| Channelization Code Set (7) | Transport Block Size (6) |
| Modulation Scheme (1) | HARQ Process ID (3) |
| | Redundancy and Constellation Version (3) |
| | New Data Indicator (1) |
| | UE Identification (16) |

The UE has to monitor up to at most four HS-SCCHs and selects one of them intended for the UE. Thus, if the UE determines that control information has been transmitted for the UE after demodulating at most four the HS-SCCHs, the UE has to demodulate the HS-PDSCH. If the HS-PDSCH is not intended for the UE, the UE demodulates the next HS-SCCHs.

The above control information delivered on the HS-SCCH illustrated in Table 1 will be described in more detail.

The Channelization Code Set (CCS) indicates the number of channelization codes used for the HS-PDSCH. The CCS is 7 bits and provides the number and types of codes with which the UE performs despreading. Up to 15 channelization codes are available for the HS-PDSCH according to the current standards.

In HSDPA, QPSK and 16QAM are available and the Modulation Scheme (MS) indicates which is to be used. Since the CCS and the MS are required before other processes can be performed, they are set in the first part of an HS-SCCH subframe.

The Transport Block Size (TBS) indicates the size of a transport block on a transport channel. The TBS is closely related to the MS and CCS and also to the subject matter of the present invention, which will be described later in great detail.

HARQ introduces two new schemes to increase the transmission efficiency of Automatic Repeat reQuest (ARQ). One of them is a retransmission request from a UE and a response from a Node B, and the other is temporary storage of erroneous data and combining of initial transmission data with retransmission data.

n-channel Stop and Wait (SAW) HARQ was introduced to HSDPA to overcome the shortcomings of a conventional SAW ARQ. The SAW ARQ does not transmit a current data packet until an ACKnowledgement (ACK) is received for the previous data packet. Therefore, even though the current data packet can be transmitted, the ACK for the previous data packet has to be awaited.

In contrast, the n-channel SAW HARQ can increase channel use efficiency by successively transmitting a plurality of data packets although an ACK for the previous packet is not yet received. To be more specific, n logical channels are established between the UE and the Node B and the logical channels are identified by their specific times or channel numbers. Thus, upon receipt of a data packet, the UE can identify the logical channel that has delivered the data packet and take a necessary action such as rearranging data packets in a proper order or soft-combines corresponding data packets. The HARQ Process ID (HAP) in Table 1 indicates a logical channel that delivers a data packet among the n logical channels.

The Redundancy and Constellation Version (RV) varies with a modulation scheme. The RV is given as Table 2 for 16QAM and as Table 3 for QPSK. In Tables 2 and 3, $X_{rv}$ denotes an RV coding value according to parameters s and r or parameters s, r and b. The parameters s and r are used for rate matching.

TABLE 2

| $X_{rv}$ | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 0 | 0 | 2 |
| 6 | 1 | 0 | 3 |
| 7 | 0 | 1 | 0 |

TABLE 3

| $X_{rv}$ | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

The parameter b in Table 2 is information about constellation rearrangement, set forth in Table 4. Transmission is carried out in one of the following four ways.

TABLE 4

| b | Output bit sequence | Operation |
|---|---|---|
| 0 | $s_1, s_2, s_3, s_4$ | None |
| 1 | $s_1, s_2, \bar{s}_3, \bar{s}_4$ | Swapping MSBs with LSBs |
| 2 | $s_1, s_2, \bar{s}_3, \bar{s}_4$ | Inversion of the logical values of LSBs |
| 3 | $s_3, s_4, \bar{s}_1, \bar{s}_2$ | 1 & 2 |

The above-described control information bits of the HS-SCCH are dependent on an ACK/Negative ACK (NACK) and a Channel Quality Indicator (CQI) transmitted from the receiver to the transmitter. In the case where the transmitter is to transmit a new packet in response to an ACK received from the receiver, the transmitter notifies the receiver that a new data packet is to be transmitted by the New Data Indicator (NDI). At the same time, the transmitter notifies the receiver of the RV parameter and the HAP. Also, the transmitter determines a modulation scheme and the number of channelization codes according to a CQI received from the receiver and notifies the receiver of the determined modulation scheme and number of channelization codes by the MS and CCS. Consequently, the control information bits of the HS-SCCH are determined based on the ACK/NACK and CQI received from the receiver.

This control information flow between the transmitter and the receiver is illustrated in FIG. 2. Referring to FIG. 2, at an initial transmission, the transmitter sets the NDI to 'NEW' to notify the receiver of the initial transmission. The transmitter also notifies the receiver of the parameters s, r and b used for the transmission by the RV coding value, $X_{rv}$. $X_{rv}$ is selected from 0 to 7 illustrated in Table 2 or Table 3, which is expressed as '$X_{rv} \in \{0\sim7\}$' in FIG. 2.

After decoding a received packet, the receiver determines whether to transmit an ACK or NACK and transmits to the transmitter the ACK or NACK on a High Speed Downlink Dedicated Physical Control CHannel (HS-DPCCH). If receiving the NACK, the transmitter needs to retransmit the transmitted packet. Hence, it sets the NDI to 'CONTINUE' and selects one of $X_{rv}$ values 0 to 7. On the other hand, upon receipt of the ACK, the transmitter sets the NDI to 'NEW' and selects one of $X_{rv}$ values 0 to 7 to transmit a new packet.

Regarding the UE Identification (UE-ID), the UE is assigned up to four HS-SCCHs, as stated earlier, and has to monitor each SCCH subframe to detect an SCCH with its UE-ID. A 16-bit UE-ID is not included as bit information. It is expanded to 40 bits and masked onto Part 1 after rate matching. Therefore, the UE cannot compare its UE-ID with a received UE-ID directly from a decoded bit sequence. It uses the UE-ID as a criterion to determine the reliability of decoding.

FIG. 3 is a block diagram of an HS-SCCH encoder for encoding control information to be transmitted on the HS-SCCH. Referring to FIG. 3, an SCCH information controller 100 generates control information, i.e. $X_{ms}$, $X_{ccs}$, $X_{tbs}$, $X_{hap}$, $X_{ndi}$, and $X_{ue}$ representing an MS, a CCS, a TBS, an HAP, an NDI, and a UE-ID respectively, and HARQ-related information such as parameters s, r and b with which to generate an RV.

A multiplexer (MUX) 102 multiplexes $X_{ms}$ and $X_{ccs}$ to $X_1$. An RV encoder 110 generates $X_{rv}$ using the parameters s, r and b. A MUX 112 multiplexes $X_{tbs}$, $X_{hap}$, $X_{rv}$ and $X_{ndi}$ to $X_2$.

A channel encoder 104 encodes $X_1$ to $Z_1$. A rate matcher 106 rate-matches $Z_1$, thus outputting $R_1$. The channel encoder 104 uses a rate 1/3 convolutional code. 8-bit Part 1 control information is extended to 40 bits by channel encoding in the channel encoder 104 and rate matching in the rate matcher 106. A UE-specific masker 108 masks $R_1$ with $X_{ue}$ and the resulting $S_1$ is mapped to Part 1 of the HS-SCCH by a physical channel mapper 120.

A UE-specific CRC attacher 114 generates a 16-bit CRC according to the UE-ID for the total sequence of Part 1 and Part 2 ($X_1+X_2$) received from the MUXes 102 and 112 and attaches the CRC to Part 2. The resulting Y is encoded in a channel encoder 116 using a rate 1/3 convolutional code. $Z_2$ output from the channel encoder 116 is rate-matched in a rate matcher 118. 13-bit Part 2 control information is extended to 80 bits by CRC addition in the UE-specific CRC attacher 114, channel encoding in the channel encoder 114, and rate matching in the rate matcher 118. The output $R_2$ of the rate matcher 118 is mapped to Part 2 of the HS-SCCH by the physical channel mapper 120.

As described before, the transmitter transmits the control information on the HS-SCCH two slots before data transmission on the HS-PDSCH, to thereby provide information required for demodulation and decoding of the HS-PDSCH. The receiver demodulates the HS-PDSCH based on the control information received on the HS-SCCH.

With reference to FIG. 4, a transport block used for high-speed downlink packet transmission in HSDPA will be described in more detail. As illustrated in FIG. 4, the transport block includes a Media Access Control (MAC)-hs header and MAC-hs payload. The MAC-hs payload has MAC-hs Service Data Units (SDUs) and padding bits. The MAC-hs SDU are equivalent to MAC-d Protocol Data Unit (PDU). The size of the MAC-hs header is variable, and the padding bits are optional in the transport block.

The MAC-hs header includes the following fields:

Version Flag (VF): The VF field is a 1-bit flag providing extension capabilities of the MAC-hs PDU format. The VF field shall be set to be zero and the value one is reserved in the current version of the protocol.

Queue ID: The Queue ID field provides identification of a reordering queue in the receiver, in order to support independent buffer handling of data belonging to different reordering queues. The length of the Queue ID field is 3 bits.

Transmission Sequence Number (TSN): The TSN field provides an identifier for the transmission sequence number on the HS-DSCH. The TSN field is used for reordering purposes to support in-sequence delivery to higher layers. The length of the TSN field is 6 bits.

Size Index Identifier (SID): The SID field identifies the size of a set of consecutive MAC-d PDUs. The MAC-d PDU size for a given SID is configured by higher layers is independent for each Queue ID. The length if the SID field is 3 bits.

Number of MAC-d PDUs (N): The number of consecutive MAC-d PDUs with the same size is identified with the N field. The length of the N field is 7 bits. In Frequency Division Duplex (FDD) mode, the maximum number of PDUs transmitted in a single Transmission Time Interval (TTI) shall be assumed to be 70.

Flag (F): The F field is a flag indicating if more SID fields are present or not. If the F field is set to '0', the field is followed by an additional set of SID, N and F fields. If the field is set to '1', the F field is followed by a MAC-d PDU.

The padding bits in the MAC-hs payload of the transport block are optionally included to match the transport block size and they do not provide any information. As far as the information bits are concerned, the padding bits are unnecessary.

When the transport block is mapped to a physical channel, the addition of unnecessary the padding bits to the transport block leads to a lower coding rate than without the padding bits. Hence, if the transport block is without the padding bits, the resulting increase in coding rate increases throughput.

In this case, the transport block size is changed by as many bits as the number of the padding bits, and thus different from the TBS known to the receiver. Hence, the size of the changed transport block must be sent to the receiver, with additional information bits.

Considering that the HSDPA channel is transmitted every 2 ms, however, the notification is not easy. It is preferable to inform the receiver of the transport block size in which the number of padding bits is taken into account without additional information bits. Also, since channel encoding is performed on a transport block without the padding bits, the channel decoder of the receiver has to decode a received transport channel correspondingly. That is, the receiver has to perform de-rate matching and channel decoding according to the size of a transport block rate-matched and channel-encoded in the transmitter.

SUMMARY OF THE INVENTION

An object of the present invention is to substantially solve at least the above problems and/or disadvantages and to provide at least the advantages below. Accordingly, the present invention provides a transmitting and receiving apparatus and method for preventing a coding rate decrease caused by the presence of padding bits in a transport block in order to increase system throughput in a wireless packet data communication system.

The present invention also provides a transmitting and receiving apparatus and method for transmitting a transport block without padding bits, thereby increasing a coding gain by as much as the number of the eliminated padding bits and thus increasing system throughput in a wireless packet data communication system.

The present invention also provides a transmitting and receiving apparatus and method for transmitting a transport block without padding bits and notifying the receiving apparatus of the number of the eliminated padding bits without additional information bits in a wireless packet data communication system.

The present invention also provides a transmitting and receiving apparatus and method for transmitting a transport block without padding bits after transport channel encoding, along with information indicating the number of the padding bits from the transmitting apparatus, and extracting the padding bit number information from received control information, transport channel-decoding the transport block without the padding bits, taking into account the number of the padding bits, and thus extracting information bits in the receiving apparatus.

The present invention provides a transmitting and receiving apparatus and method for transmitting additional control information about the number of padding bits without an additional information bit field by efficiently utilizing an existing control information field.

According to an aspect of the present invention, in a wireless packet data transmitter for transmitting data packet on a transport channel and control information for supporting the transport channel on a control channel to a wireless packet data receiver in a wireless packet data communications system, optional padding bits are eliminated from a transport block for data packet transmission. The transport block without the padding bits is transport channel-encoded and transmitted on the transport channel. Control information including a padding bit number indicator indicating the number of the eliminated padding bits is control channel-encoded and transmitted on the control channel.

According to another aspect of the present invention, in a wireless packet data receiver for receiving data packet on a transport channel and control information for supporting the transport channel on a control channel from a wireless packet data receiver in a wireless packet data communications system, control channel-encoded control information is received on the control channel and control channel-decoded. Transport block size information included in the control channel-decoded control information is corrected based on a padding bit number indicator included in the control channel-decoded control information. A transport channel-encoded transport block without padding bits is received on the transport channel and transport channel-decoded according to the corrected transport block size.

If the wireless packet data communication system is HSDPA, the transmitter transmits the padding bit indicator in a redundancy and constellation version (RV) field configured for the transmission of the RV information, instead of the RV information, if the transport block is an initial transmission block carrying a new data packet. If the transport block is a retransmission block carrying a retransmission data packet, the transmitter selects one of the predetermined RV coding values and transmits in the RV field the selected RV coding value as the RV information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 5:
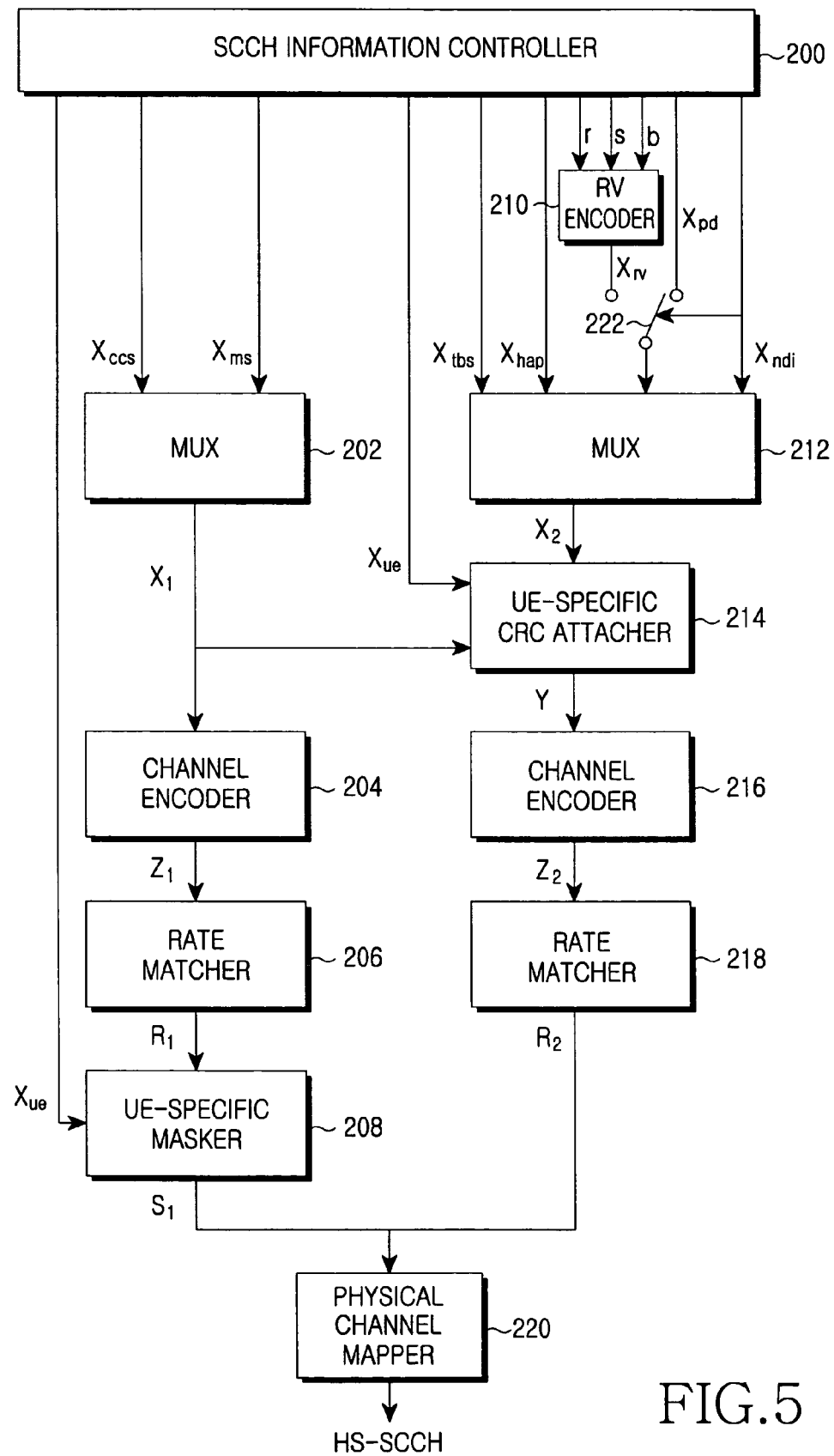
FIG. 5 is a block diagram of an HS-SCCH encoder in a packet data transmitter in a HSDPA system according to the present invention.
Figure 6:
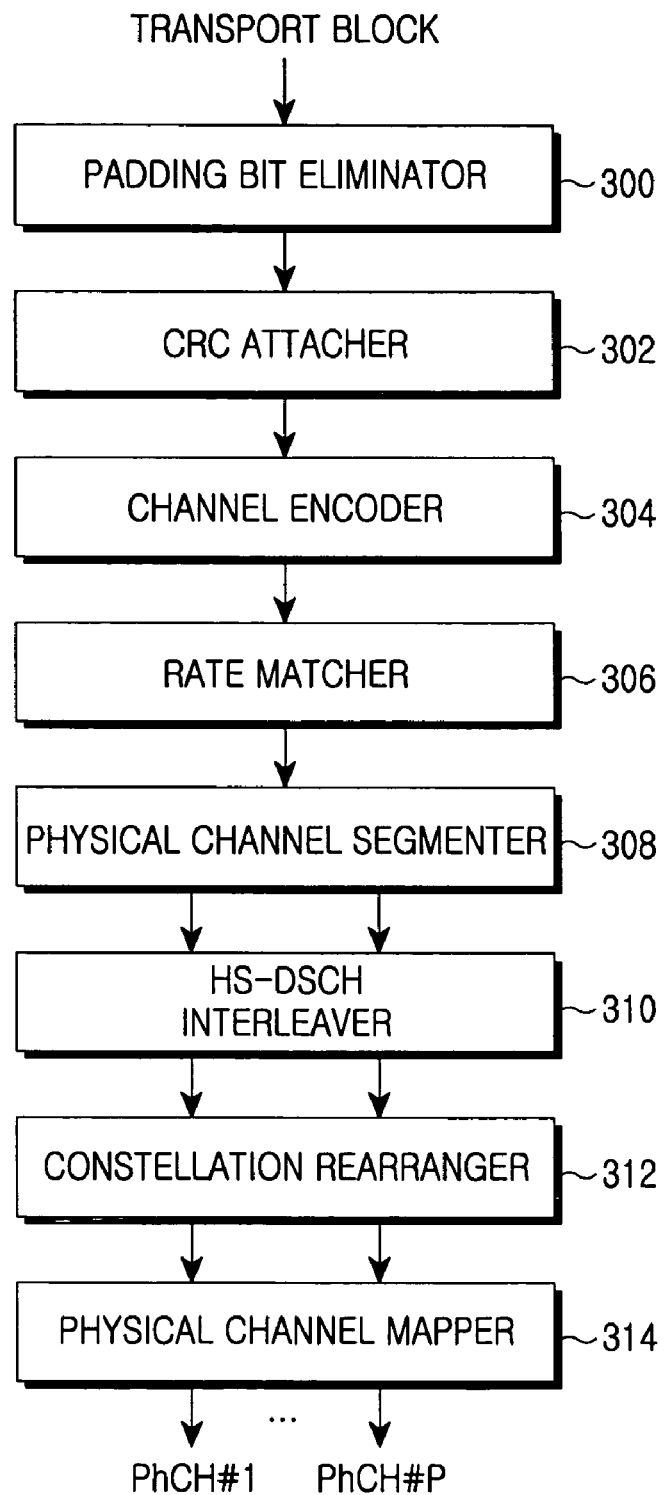
FIG. 6 is a block diagram of an HS-PDSCH encoder in the packet data transmitter in the HSDPA system according to the present invention.

FIGS. 5 and 6 are block diagrams of an HS-SCCH encoder as a control channel encoder and an HS-PDSCH encoder as a transport channel encoder in a packet data transmitter in a HSDPA system according to the present invention. In the illustrated cases of FIGS. 5 and 6, the present invention is implemented in the context of HSDPA.

Referring to FIG. 6, the HS-PDSCH encoder eliminates optional padding bits from a transport block carrying packet data and encodes the transport block without the padding bits (transport channel encoding or HS-PDSCH encoding), prior to transmission on the HS-PDSCH. According to the present invention, the HS-PDSCH encoder further includes a padding bit eliminator 300 in addition to the components of a typical HS-PDSCH encoder, i.e. a CRC attacher 302, a channel encoder 304, a rate matcher 306, a physical channel segmenter 308, an HS-DSCH interleaver 310, a constellation rearranger for 16QAM 312, and a physical channel mapper 314.

Figure 4:
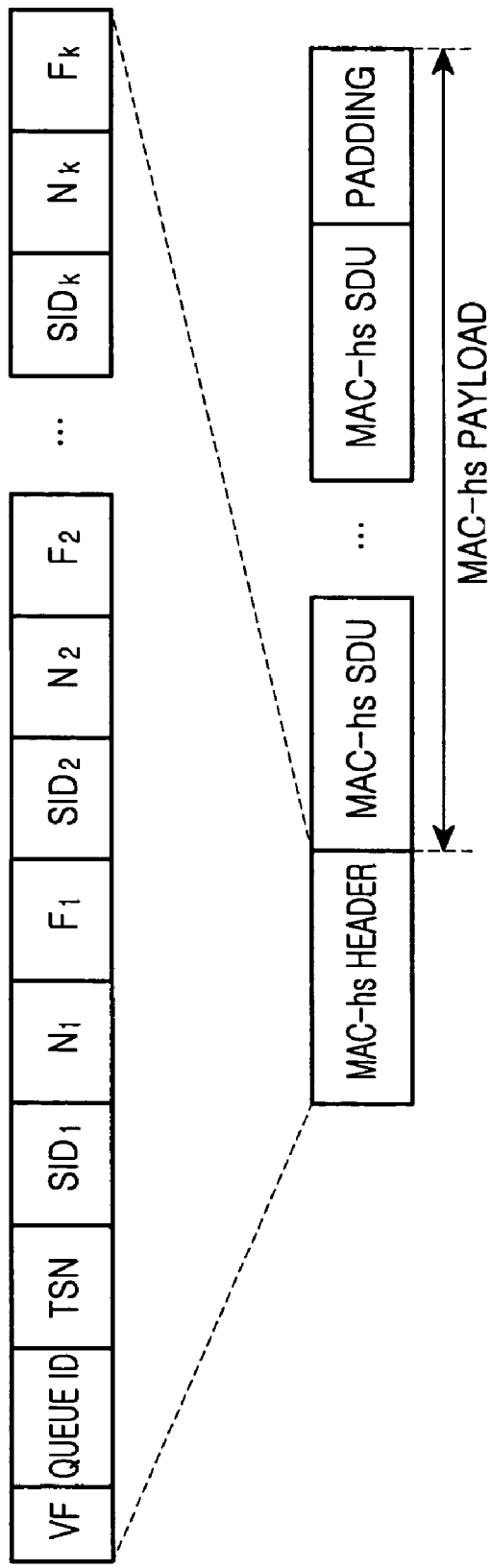
FIG. 4 illustrates the structure of a transport block for delivering a high-speed downlink packet.

A transport block having the configuration illustrated in FIG. 4 is provided to the padding bit eliminator 300 from a MAC layer (not shown). If the transport block includes padding bits, the padding bit eliminator 300 eliminates the padding bits and provides the resulting transport block to the CRC attacher 302. Subsequently, the transport block without the padding bits is HS-PDSCH-encoded and transmitted on physical channels PhCH#1 to PhCH#P. The HS-PDSCH-encoding is performed in a general way through the CRC attacher 302, the channel encoder 304, the rate matcher 306, the physical channel segmenter 308, the HS-DSCH interleaver 310, the constellation rearranger 312, and the physical channel mapper 314. Thus, its detailed description is not provided herein.

Referring to FIG. 5, the HS-SCCH encoder includes a Padding Bit Number Indicator indicating the number of the eliminated padding bits in the control information and encodes the control information (control channel encoding or HS-SCCH encoding), prior to transmission on the HS-SCCH.

Table 5 below lists control information bits transmitted on the HS-SCCH according to the present invention which is implemented in HSDPA. Numerals in the brackets denote the number of information bits.

TABLE 5

| Part 1 | Part 2 |
|---|---|
| Channelization Code Set (7) | Transport Block Size (6) |
| Modulation Scheme (1) | HARQ Process ID (3) |
|  | Redundancy and Constellation Version (3)/Padding Bit Number Indicator (3) |
|  | New Data Indicator (1) |
|  | UE Identification (16) |

Table 5 is the same as Table 1 illustrating the configuration of control information recommended by the present standards, in that Part 1 includes the CCS and MS and Part 2 includes the TBS, HAP, RV, NDI, and UE-ID but different from Table 1 in that the RV field is modified to additionally have the Padding Bit Number Indicator.

If one of the RV coding values, $X_{rv}$ 0 to 7 is preset as a default for initial transmission between the transmitter and the receiver, there is no need for transmitting $X_{rv}$ at an initial transmission. The transport block size is equal for initial transmission and retransmission.

Hence, the HS-SCCH encoder transmits the Padding Bit Indicator in the RV field instead of RV information at an initial transmission, and transmits an RV coding value, $X_{rv}$ in the RV field at a retransmission.

The receiver determines that information received in the RV field at the initial transmission is the Padding Bit Number Indicator, not $X_{rv}$. The receiver determines the number of padding bits eliminated by the transmitter from the Padding Bit Number Indicator, and considers $X_{rv}$ to be the default value. At the retransmission, the receiver recognizes the information received in the RV field as $X_{rv}$ as usual. Since the same transport block size is used at the initial transmission and the retransmission, the number of padding bits eliminated in the transmitter is not changed. Accordingly, the receiver has knowledge of the number of eliminated padding bits achieved at the initial transmission, without receiving the Padding Bit Number Indicator at the retransmission.

The maximum number of retransmissions is 4 or 8 for HARQ and the order of the RV coding values is not defined in the current standards. Given the maximum number of retransmissions=8, each of $X_{rv}$ values 0 to 7 shown in Table 2 or Table 3 cannot be used even once, or can be used up to eight times. In the case where the receiver transmits an NACK continuously, $X_{rv}$ can be used as follows.

TABLE 6

| Initial transmission | $X_{rv} = 0$ |
|---|---|
| 1$^{st}$ retransmission | $X_{rv} = 1$ |
| 2$^{nd}$ retransmission | $X_{rv} = 2$ |
| 3$^{rd}$ retransmission | $X_{rv} = 3$ |
| 4$^{th}$ retransmission | $X_{rv} = 4$ |
| 5$^{th}$ retransmission | $X_{rv} = 6$ |
| 6$^{th}$ retransmission | $X_{rv} = 7$ |
| 7$^{th}$ retransmission | $X_{rv} = 2$ | where $X_{rv}=5$ is not used even once and $X_{rv}=2$ is used twice.

In another example,

TABLE 7

| Initial transmission | $X_{rv} = 0$ |
|---|---|
| 1$^{st}$ retransmission | $X_{rv} = 0$ |
| 2$^{nd}$ retransmission | $X_{rv} = 0$ |
| 3$^{rd}$ retransmission | $X_{rv} = 0$ |
| 4$^{th}$ retransmission | $X_{rv} = 0$ |
| 5$^{th}$ retransmission | $X_{rv} = 0$ |
| 6$^{th}$ retransmission | $X_{rv} = 0$ |
| 7$^{th}$ retransmission | $X_{rv} = 0$ | where $X_{rv}=0$ is used for all transmission and retransmissions.

If the number of retransmissions is 8, it is preferable to use the RV coding values, $X_{rv}$ 0 to 7 each once.

TABLE 8

| Initial transmission | $X_{rv} = 0$ |
|---|---|
| 1$^{st}$ retransmission | $X_{rv} = 1$ |
| 2$^{nd}$ retransmission | $X_{rv} = 2$ |
| 3$^{rd}$ retransmission | $X_{rv} = 3$ |
| 4$^{th}$ retransmission | $X_{rv} = 4$ |
| 5$^{th}$ retransmission | $X_{rv} = 5$ |
| 6$^{th}$ retransmission | $X_{rv} = 6$ |
| 7$^{th}$ retransmission | $X_{rv} = 7$ |

Considering the parameters s, r and b, it is preferred that $X_{rv}$ is set to 0 at an initial transmission. Thus, the default RV coding value preset between the transmitter and the receiver for the initial transmission is preferably 0.

The HS-SCCH encoder of FIG. 5 thus transmits the RV coding value $X_{rv}$ or the Padding Bit Number Indicator in the RV field according to the NDI, $X_{ndi}$. Compared to the HS-SCCH encoder of FIG. 3, the HS-SCCH encoder of the present invention further includes a switch 222 for switching one of the RV coding value $X_{rv}$ from an RV encoder 210 and the Padding Bit Number Indicator, $X_{pd}$ according to the NDI, $X_{ndi}$ to a MUX 212.

At an initial transmission, the transmitter sets $X_{ndi}$ to 'NEW'. Then the switch 222 switches $X_{pd}$ to the MUX 212. Thus, $X_{pd}$ is transmitted in the RV field. Since $X_{rv}$ is a default value of 0 at the initial transmission, there is no need for transmitting $X_{rv}$.

At a retransmission, the transmitter sets $X_{ndi}$ to 'CONTINUE'. Then the switch 222 switches $X_{rv}$ to the MUX 212. Thus, $X_{rv}$ is transmitted in the RV field, as is the general case. Since $X_{pd}$ is the same in both the initial transmission and the retransmission, it is transmitted only once at the initial transmission.

Figure 1:
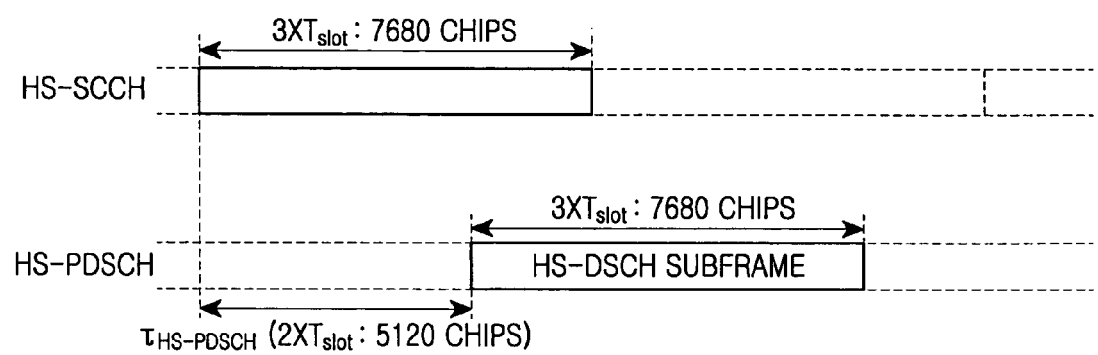
FIG. 1 is a diagram illustrating the timing relationship between an HS-SCCH and its associated HS-PDSCH in HSDPA.
Figure 2:
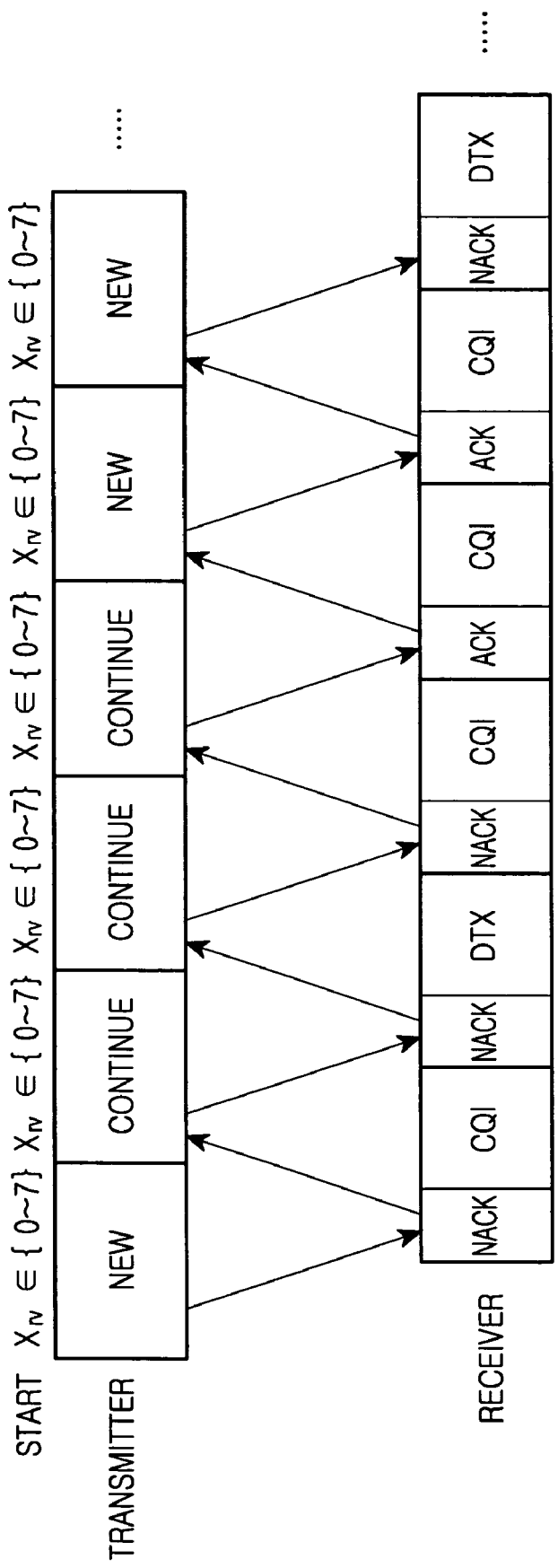
FIG. 2 is a diagram illustrating a flow of control information between a transmitter and a receiver in a typical HSDPA system.
Figure 3:
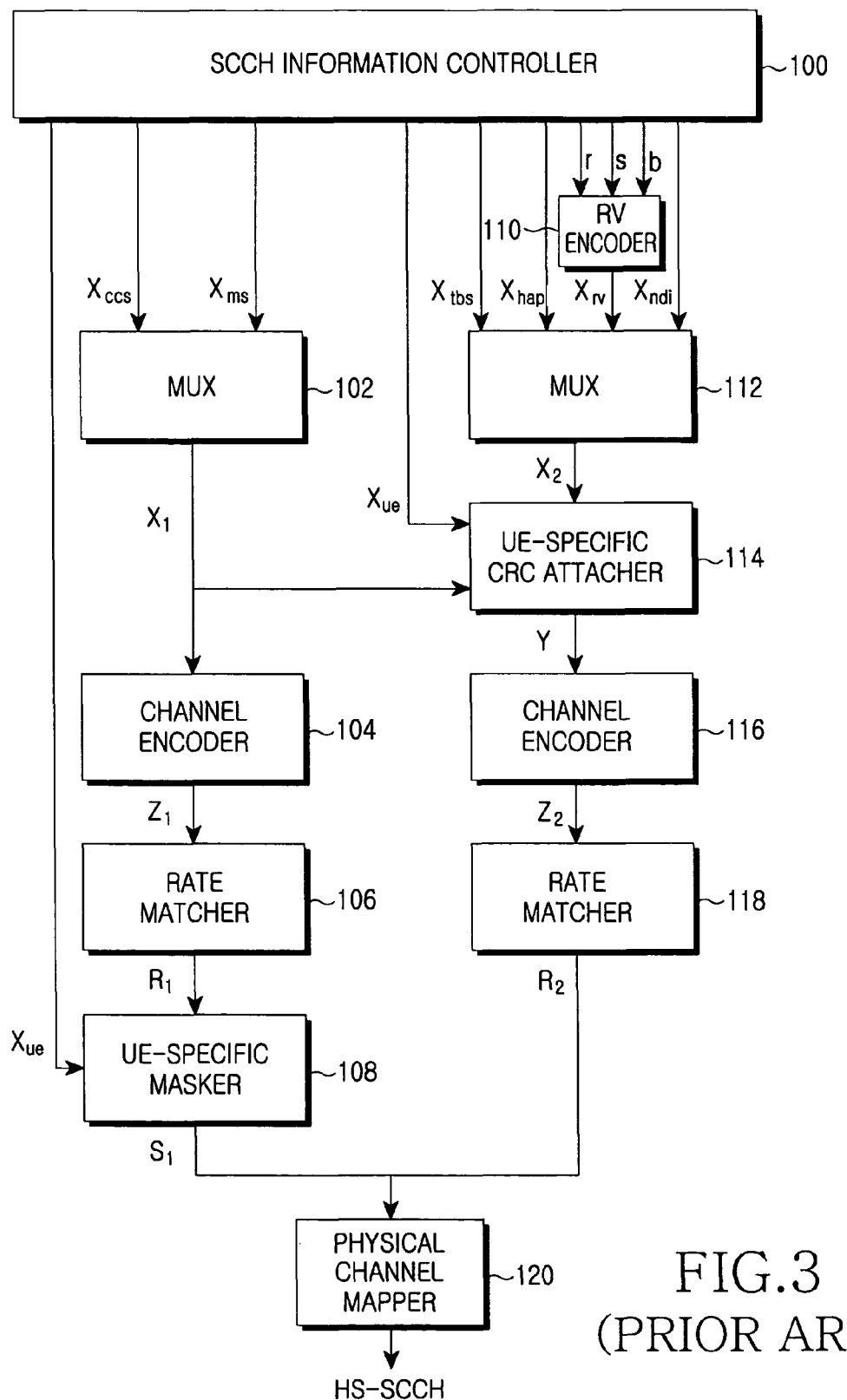
FIG. 3 is a block diagram of an HS-SCCH encoder in a packet data transmitter in the typical HSDPA system.

Except for the fact that either $X_{rv}$ or $X_{pd}$ is transmitted in the RV field depending on initial transmission or retransmission, the HS-SCCH encoder of FIG. 5 is identical to that of FIG. 3. Therefore, the other components that is, an SCCH information controller 200, MUXes 202 and 212, a UE-specific CRC attacher 214, channel encoders 204 and 216, rate matchers 206 and 218, a UE-specific masker 208, and a physical channel mapper 220 are basically the same as their counterparts in FIG. 3 in configuration and perform HS-SCCH encoding in the same manner.

Figure 7:
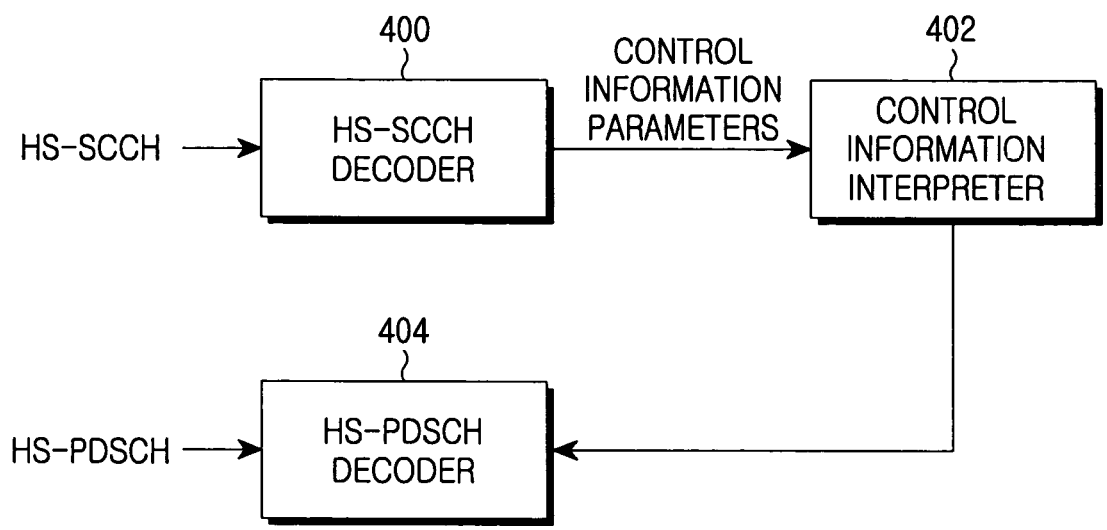
FIG. 7 is a block diagram of a packet data receiver in the HSDPA system according to the present invention.

FIG. 7 is a block diagram of a packet data receiver in the HSDPA system according to the present invention. Referring to FIG. 7, an HS-SCCH decoder 400 as a control channel decoder decodes control information received on the HS-SCCH (control channel decoding or HS-SCCH decoding), thereby extracting control information parameters illustrated in Table 5. A control information interpreter 402 corrects a TBS based on a Padding Bit Number Indicator included in the decoded control information.

Figure 8:
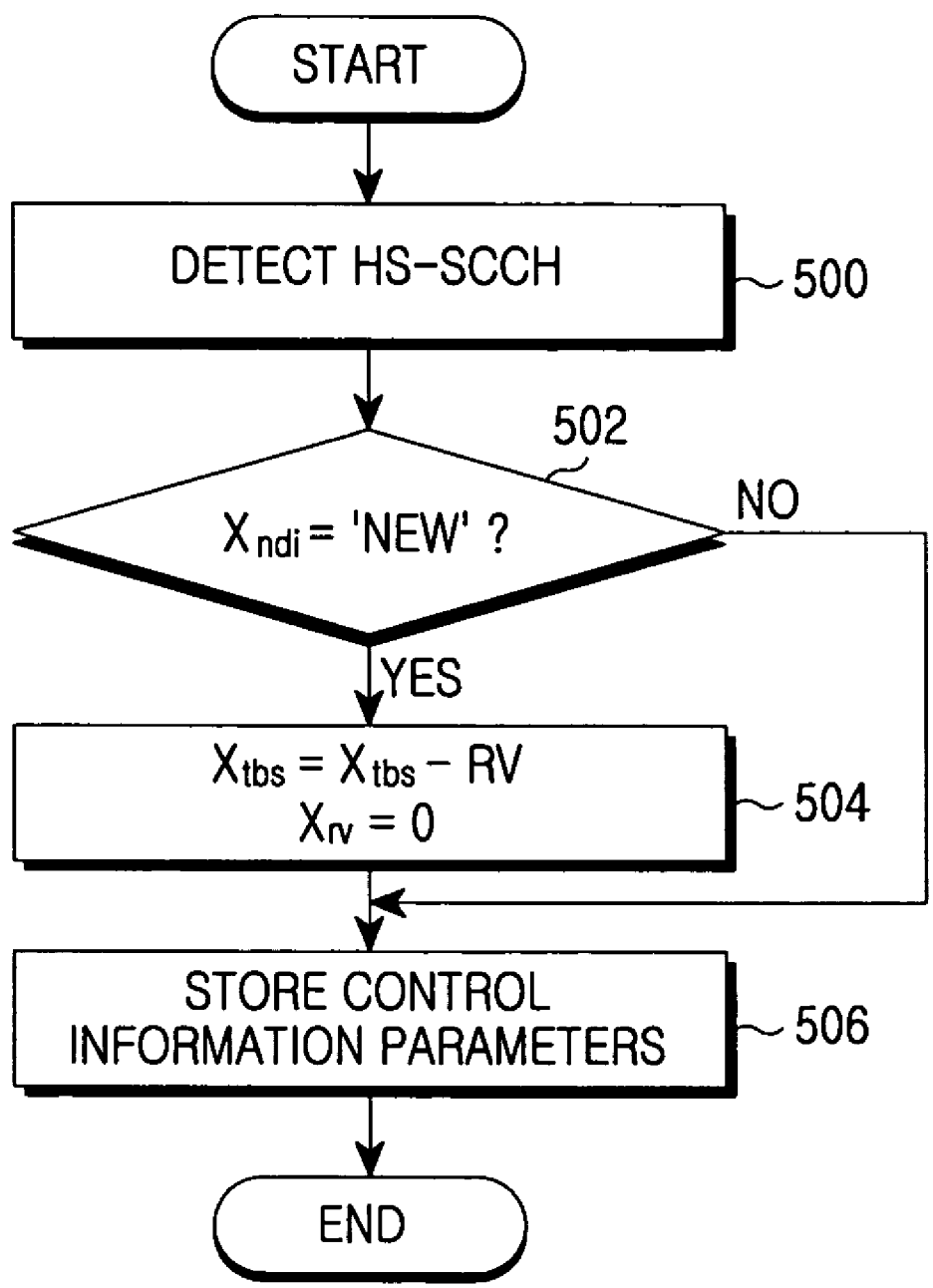
FIG. 8 is a flowchart illustrating an operation of a control information interpreter according to the present invention.

The operation of the control information interpreter 402 will be described with reference to FIG. 8. In FIG. 8, upon receipt of the HS-SCCH at the UE in step 500, the HS-SCCH decoder 400 provides decoded control information to the control information interpreter 402. In step 502, the control information interpreter 402 determines whether an NDI value, $X_{ndi}$ is 'NEW' or 'CONTINUE'. If $X_{ndi}$ is 'CONTINUE', the control information interpreter 402 considers that $X_{rv}$ is in an RV field is $X_{rv}$ and stores $X_{rv}$ together with the other control information parameters, as is the usual case, in step 506.

On the other hand, if $X_{ndi}$ is 'NEW', the control information interpreter 402 considers that $X_{pd}$ is in the RV field and corrects a TBS by subtracting a Padding Bit Number Indicator $X_{pd}$ from the TBS $X_{tbs}$ in step 504. The corrected TBS represents the size of a transport block without padding bits. At the same time, $X_{rv}$ is decided as 0. In step 506, the corrected TBS, $X_{tbs}$ and the RV coding value, $X_{rv}$ are stored together with the other control information parameters.

The control information interpreter 402 provides the above control information to a HS-PDSCH decoder 404 for decoding the HS-PDSCH. The HS-PDSCH decoder 404 HS-PDSCH-decodes an HS-PDSCH-encoded transport block without padding bits received on the HS-PDSCH through de-rate matching and channel decoding in accordance with the corrected TBS.

In accordance with the present invention as described above, as the amount of packet data actually transmitted on a transport channel is reduced by as many bits as the number of eliminated padding bits, the number of punctured bits during rate matching is decreased. Therefore, a coding gain corresponding to the number of the padding bits is achieved and thus system throughput is increased. Furthermore, information about the number of the padding bits can be transmitted without an additional information bit field through efficient use of an existing control information field.

While the invention has been shown and described with reference to certain preferred embodiments thereof, they are mere exemplary applications. While the present invention is implemented in HSDPA in these embodiments, it is also applicable to 1×EV-DV. Besides downlink packet data transmission, the present invention can be applied to uplink packet data transmission like EUDCH in the same manner. Therefore, it will be understood by those skilled in the art that various changes in form and details may be made therein without departing from the spirit and scope of the invention as defined by the appended claims.

What is claimed is:

1. A wireless packet data transmitter for transmitting to a wireless packet data receiver data packet on a transport channel and control information for supporting the transport channel on a control channel in a wireless packet data communications system, comprising:
   a padding bit eliminator for eliminating optional padding bits of a variable size from a transport block for data packet transmission;
   a transport channel encoder for transport channel-encoding the transport block without the padding bits and transmitting the encoded transport block on the transport channel; and
   a control channel encoder for control channel-encoding the control information including a padding bit number indicator indicating the number of the eliminated padding bits and transmitting the encoded control information on the control channel,
   wherein if the transport block is an initial transmission block carrying a new data packet, the control channel encoder transmits the padding bit number indicator in a redundancy and constellation version (RV) field, and if the transport block is a retransmission block carrying a retransmission data packet, the control channel encoder selects one of predetermined RV coding values and transmits the selected RV coding value in the RV field.

2. The wireless packet data transmitter of claim 1, wherein the wireless packet data communications system is a high speed downlink packet access (HSDPA) system, the transport channel is a high speed physical downlink shared channel (HS-PDSCH), and the control channel is a high speed shared control channel (HS-SCCH).

3. The wireless packet data transmitter of claim 1, wherein an RV coding value preset between the wireless packet data transmitter and the wireless packet data receiver among the RV coding values is selected as a default at initial transmission.

4. The wireless packet data transmitter of claim 3, wherein the RV coding value selected as the default is 0.

5. The wireless packet data transmitter of claim 1, wherein the transport channel encoding includes rate matching and channel encoding.

6. A method of transmitting to a wireless packet data receiver data packet on a transport channel and control information for supporting the transport channel on a control channel in a wireless packet data communications system, comprising:
   eliminating optional padding bits of a variable size from a transport block for data packet transmission;
   transport channel-encoding the transport block without the padding bits and transmitting the encoded transport block on the transport channel; and
   control channel-encoding the control information including a padding bit number indicator indicating the number of the eliminated padding bits and transmitting the encoded control information on the control channel,
   wherein control channel encoding comprises:
   transmitting the padding bit number indicator in a redundancy and constellation version (RV) field, if the transport block is an initial transmission block carrying a new data packet; and
   selecting one of predetermined RV coding values and transmitting the selected RV coding value in the RV field, if the transport block is a retransmission block carrying a retransmission data packet.

7. The method of claim 6, wherein the wireless packet data communications system is a high speed downlink packet access (HSDPA) system, the transport channel is a high speed physical downlink shared channel (HS-PDSCH), and the control channel is a high speed shared control channel (HS-SCCH).

8. The method of claim 6, wherein a predetermined RV coding value among the RV coding values is selected as a default at the initial transmission.

9. The method of claim 8, wherein the RV coding value selected as the default is 0.

10. The method of claim 6, wherein the transport channel encoding step comprises transport channel-encoding the transport block without the padding bits through rate matching and channel encoding.

* * * * *